Feb. 16, 1971 A. J. FINK 3,563,859
DISPOSABLE CULTURE DEVICE

Filed Oct. 16, 1967 2 Sheets-Sheet 1

INVENTOR
AARON J. FINK

Feb. 16, 1971   A. J. FINK   3,563,859
DISPOSABLE CULTURE DEVICE
Filed Oct. 16, 1967   2 Sheets-Sheet 2

INVENTOR
AARON J. FINK

United States Patent Office 3,563,859
Patented Feb. 16, 1971

3,563,859
DISPOSABLE CULTURE DEVICE
Aaron J. Fink, 614 Springer Terrace,
Los Altos, Calif. 94022
Filed Oct. 16, 1967, Ser. No. 675,470
Int. Cl. C12b *1/00;* C12k *1/04, 1/10*
U.S. Cl. 195—140                                7 Claims

ABSTRACT OF THE DISCLOSURE

A disposable culture device for testing for the presence and number of bacteria utilizes a media support contained in an independent enclosure for incubation and bacteria colony growth.

BACKGROUND OF THE INVENTION

Field of the invention

This invention relates to a novel and improved disposable bacteria culture test device.

Description of the prior art

Various techniques have been proposed for testing for the presence of bacteria and for determining the bacterial colony count. Presently known methods are generally subject to many variables that lead to erroneous evaluations, and poor control of test conditions which results in invalid conclusions. Even if the tests are properly conducted, they are tedious, time-consuming and relatively expensive.

For example, one technique known as the quantitative pour plate method utilizes a series of specimen dilutions, each being transferred sequentially from one test tube to another, and respectively inoculated at each transfer onto an agar plate. The need for a multiplicity of agar plates, pipettes, test tubes and the like, and the undue, excessive labor attendant with the test proceduce do not warrant such an approach.

In a second method, the metabolic products of bacterial growth and their reaction are measured, after incubation on colored dye indicators. In this approach, color changes are related to the presence of specific bacterial numbers in the clinical specimen. However, not all types of bacteria commonly encountered in a routine urine specimen are detected in this technique, and furthermore many false-positive and false-negative results are derived.

In still another approach, a strip of filter paper is employed for the inoculation transfer of bacteria to the surface of an agar plate. The validity of the test is based on the assumption that the absorbent filter paper transfers an accurately determined number of bacteria, after moistening by a suspect specimen. It is apparent that the amount of paper absorption, time of immersion of the paper in the specimen, and the duration of contact between the paper and the agar surface, inter alia, are variables that may lead to false determinations. Additionally, by absorbing only a very small amount of inoculum, a growth of only three bacterial colonies, for example, is equated with an estimate of 25,000 bacteria per milliliter or more in the unidentified specimen. This inability of various indicator and filter paper tests to determine accurately low levels of significant bacteria counts greatly minimizes the value of such tests.

It would be desirable to provide a reliable method for detection screening of bacteria in an unknown clinical specimen. The one type of test believed by many authorities to be capable of achieving a high level of accuracy is the quantitative bacterial colony count technique. A truly acceptable clinical test should be rapid, inexpensive, and simple enough to be performed by the patient even in the privacy and convenience of the home. Furthermore, there should be no display of false-positives or false-negatives, be interpretable by non-medical personnel be reliably accurate for quantitative colony counts at all levels of bacteria, afford prompt inoculation of the collected specimen and provide for facile distinction between bacterial species. In addition the testing device should have a sustained storage shelf-life, be suitable for mailing, and allow initiation of antibiotic sensitivity testing.

SUMMARY OF THE INVENTION

An object of this invention is to provide a novel and improved test device for quantitative bacterial culture and colony count detection.

Another object of this invention is to provide a test device that is adapted for storage, collection of specimen and incubation, with optimum standardization and a minimum of error in test evaluation.

Another object is to provide a test device for detection and measurement of bacterial colonies found in urine specimens.

According to this invention, a device for testing for the presence and quantity of bacterial colonies comprises a culture media support having a plurality of recesses wherein the media are secured. The media support, which is preferably a transparent plastic rectangular element, is adapted to be engaged by a rectangular container or housing which has guides formed on its inner sidewalls to accommodate the support or insert. To enclose the assembly, an apertured cap or cover is provided, which seats on the rectangular container to form an air-tight seal with the housing.

The culture insert is tapered or wedge-shaped to allow excess specimen to drip down after the insert has been exposed to a quantity of the fluid or liquid specimen, such as urine by way of example.

Prior to use, the aperture in the cap is covered by an adhesive strip, for example, to preclude dehydration of the media. During use, the strip is repositioned to expose the aperture and the media insert to ambient air. The strip also serves as an identification label for the individual test device.

DESCRIPTION OF THE DRAWINGS

The invention will be described in greater detail with reference to the drawings in which.

Similar numerals refer to similar elements throughout the drawing.

DETAILED DESCRIPTION OF PREFERRED EMBODIMENT

Figure 5:
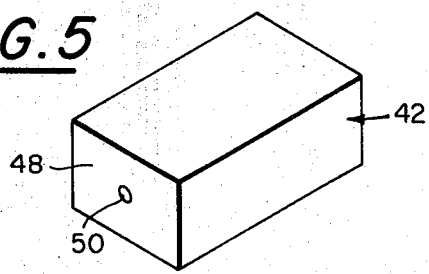
FIG. 5 is a perspective view of the cap used for enclosing the novel assembly of this invention.
Figure 6:
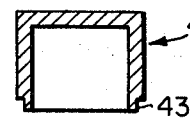
FIG. 6 is a sectional side view of the cap shown in FIG. 5.
Figure 1:
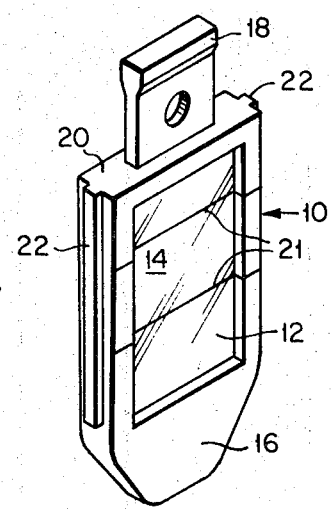
FIG. 1 is an isometric view of a culture media support, in accordance with this invention.
Figure 2:
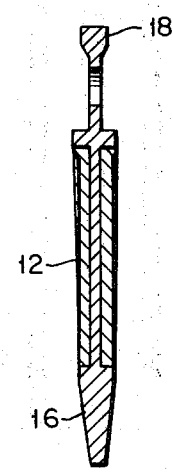
FIG. 2 is a sectional side view of the support depicted in FIG. 1.

With reference to FIGS. 1 and 2, a culture media support or insert 10 is formed with recesses 12 (only one being shown) on opposing faces of a rectangular type configuration. Each recess 12 contains a culture medium 14, preferably of different diagnostic types, which are to be inoculated substantially simultaneously. The recess 12 has an enclosing lip along its inner periphery to prevent the displacement or loss of the culture medium or agar 14. The insert 10, which is made of a clear transparent plastic has a tapered or wedge-shaped lower portion 16, which enables a runoff of excess specimen and rapid inoculation of the agar during the test procedure.

Figure 3:
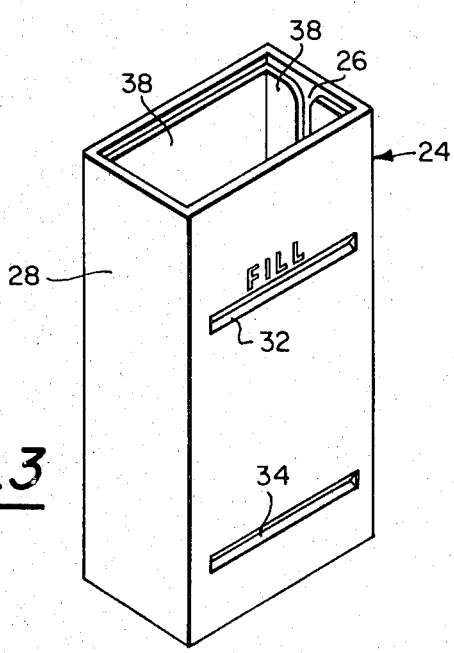
FIG. 3 is an isometric view of the container used for housing the support illustrated in FIG. 1.
Figure 4:
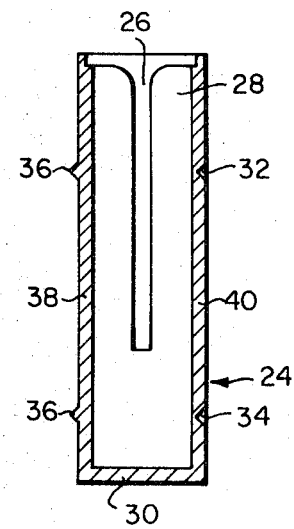
FIG. 4 is a sectional side view of the container illustrated in FIG. 3.

A handle 18 is joined to the upper end 20 of the insert 10 for facile grasping with fingers or a holding device, whereby the insert and agar may be conveniently introduced to a specimen, either in a specimen jar or by direct application. Also, guide rails 22 are formed along the edges of the support 10 for positioning within a container 24, such as depicted in FIGS. 3 and 4. The handle 18 is useful for manipulation of the insert 10, when directing the insert into the container.

The container 24, also made from a clear transparent plastic, has a pair of slots 26 along the inner side walls 28 to accommodate the guide rails 22 of the support 10. The slots 26 are flared at the top to afford easy and quick engagement of the guides 22. The slots 26 are of such length that the bottom portion 16 of the agar support 10 is limited in its descent into the container 24, and accordingly is spaced from the bottom 30 of the container 24 when the support 10 is seated in the slots or grooves 26.

The container 24 also has a grooved fill line 32 to provide a visual indication of the level of specimen that is to be utilized in those cases wherein the specimen is first passed into the container for submersion inoculation of the agar, by direct voiding or transfer from another container. In such case, the test device 10 displaces the previously inserted liquid specimen and ensures complete agar surface inoculation. The grooved fill line 32 together with a similar grooved positioner or locator line 34 serve to lock a plurality of assembled test devices, in side by side relationship, as portrayed in FIG. 7. To achieve this simple locating and locking arrangement, a pair of linear projecting segments 36 are disposed on the wall 38 opposite the wall 40 on which the grooved portions 32 and 34 are found. In this manner, a multiplicity of test assemblies may be serially joined, as needed, within the confines of an incubator, the number being limited only by the size of the incubator.

Each assembly is separately enclosed by a cap or cover 42 that is seated firmly in a close, substantially air-tight fit with the container 24, and the cap 42 encompasses the handle 16 thereby saving space. The cap 42 has a notched portion 43 for close-fit engagement with the container top to present a substantially flat, continuous exterior when assembled. Such a flat continuous surface enables air-tight sealing of the test assemblies.

When shelf-stocked, the test device 44 has an adhesive strip 46 attached to one end wall 28 of the container 24 and to an end wall 48 of the cover or cap 42. The end wall 48 has an aperture 50, which becomes exposed when the strip 46 is removed to allow removal of the cover 42 and extraction of the insert 10 from the container 24 for inoculation and subsequent incubation. The adhesive strip 46 is then relocated on the end wall 28 of the container 24 and marked with an identification to indicate the source of the specimen, for example. The exposed air hole 50 allows aerobic culturing of those bacterial colonies existing in the specimen.

Figure 7:
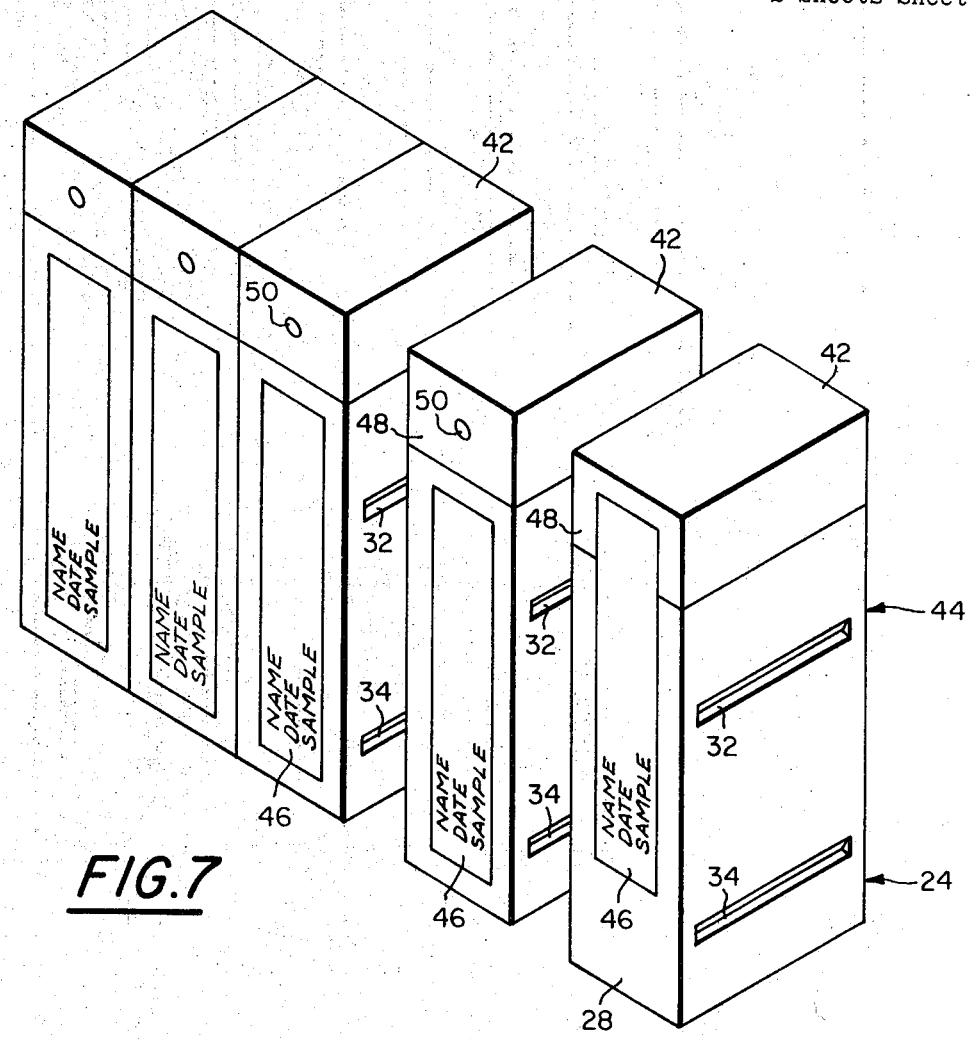
FIG. 7 represents a series of test assemblies, partially stacked for incubation, as employed during bacterial testing.
Figure 8:
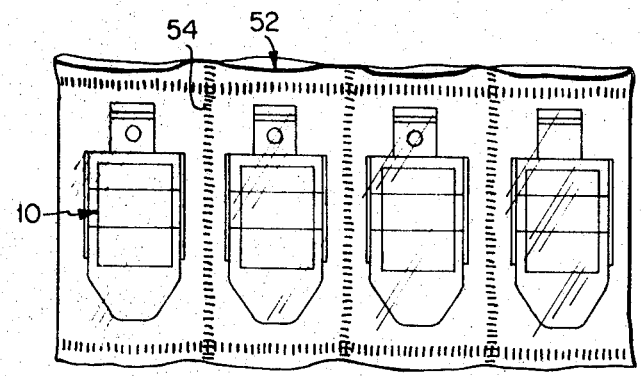
FIG. 8 is a plan view of a package for containing a multiplicity of the media supports used in the test device, separated and isolated from one another.

In practice, an identification including the name of the individual being exmained, the date, time, and method of specimen collection is imprinted on the adhesive strip 46 that is removed from the cap container assembly, and relocated on the end wall of the container as illustrated in FIG. 7. The cap 42 is removed, and the insert 10 is grasped by its handle and retracted from the container. The insert 10 is now ready for instant inoculation by direct voiding, or by insertion in a specimen container, or other known means. The insert 10 is then replaced within the container 24, and the apertured cap 42 is replaced on the housing 24. The entire assembly 44 is then placed in an incubator at a predetermined temperature for growth of suspect bacteria including contaminants and pathogens. As indicated in FIG. 7, the assemblies 44 may be locked in seriatim by means of the couplings between the grooves 32, 34 and cooperating projections 36, After the incubation period, the test assembly 44 is removed from the incubator and visually checked for bacterial colony growth, the type of bacteria that has developed, and the extent or quantity of colony growth. To aid in the quantitative measurement, measuring lines 21 are inscribed on the insert 10, which will indicate the size of colony growth.

Each insert 10 may support different agar media, such as Blood agar on one face and MacConkey agar on the other. The MacConkey agar is more selective in that it prevents common contaminant gram positive bacteria from growing while encouraging growth for any pathogenic bacteria. In this manner, it is easy to distinguish between contaminant and pathogenic bacteria from an unknown urine specimen, for example.

The inserts 10 may be packaged separately from the containers 44 in a plastic, compartmented package 52. Each insert 10 is isolated from the others by an air-tight, heat-sealed closure 54, which also allows separation of individual sections and their inserts from the rest of the strip type package. In this way, inserts having different types of media or agars may be stored for use with a lesser number of containers that initially do not hold any insert. Therefore, it is not necessary to stock an abundance of containers and caps, and yet this arrangement will afford the availability of many types of media for various forms of tests.

A feature of this invention is that the test device may be used for personal inoculation by an individual, without the usual visit to a medical laboratory or clinic, or doctor's office. A specimen may be collected at the convenience of the individual being examined, at home or elsewhere. As mentioned above, inoculation may be achieved by directly voiding upon the insert 10, flooding it from a syringe, immersing the insert 10 in a collection bottle, or by placing the insert directly into the container 24, in which a direct void or catheterized specimen has been obtained. Also, the use of a sterile assembly, as provided with this invention, precludes the need for providing specially sterile containers for urine collection.

Furthermore, since the amount of agar media and their surface areas have been standardized by the size and shape of the recesses formed on the insert support, the amount of specimen fluid that is absorbed onto each agar surface may be determined. By way of example, when using the inventive device, it has been established that each bacterial colony represents about fifty bacteria per milliliter. In addition, the use of zone marks or indicators on the transparent container and on the insert enable a quick count and evaluation of the extent of bacteria colony growth. By affording a visible count without the need for opening the enclosures, possible contamination of laboratory personnel is avoided. The enclosure configuration and its relatively small size allows ease of mailing to other laboratories or practitioners for their study and evaluation.

It should be understood that the invention is not necessarily limited to the particular example or uses set forth above. For example, the novel device may be used for detection of salmonella, fungi, water pollution and the like. Many other uses for diagnostic purposes will be apparent to those skilled in the art.

What is claimed is:

1. A disposable culture assembly for testing for the presence and quantity of bacteria comprising:

an insert device having recesses formed back-to-back in opposing surfaces for containing solid culture media therein, said device having a tapered, wedge-like portion at one end;

a handle at the other end of said insert device; and guide means formed at opposing sides of said insert device, said guide means being in a plane other than said sides, including a container having guide elements for cooperating with said guide means to seat said insert device in a fixed position within said container, and further including a cover for forming an enclosure with said container, wherein said insert device is disposed.

2. An assembly as in claim 1, wherein said container is formed with grooved locator portions and opposing projections respectively on its outer walls whereby a plurality of like containers may be positioned and locked in a fixed array.

3. An assembly as in claim 1, wherein said cover has an aperture for passing air to said culture media.

4. An assembly as in claim 3, including a removable adhesive strip joined to said cover and to said container.

5. An assembly as in claim 4, wherein said strip is positioned to seal said aperture.

6. An assembly as in claim 1, including an indicator mark inscribed on the wall of said container for indicating the fill level of a specimen within said container.

7. An assembly as in claim 1 including a partitioned package, wherein a multiplicity of said devices are individually contained in air-tight compartments, said compartments being joined but separable from each other.

References Cited

UNITED STATES PATENTS

| | | | |
|---|---|---|---|
| 2,971,892 | 2/1961 | Carski | 195—139LE |
| 3,234,107 | 2/1966 | Kaufman et al. | 195—139LE |
| 3,308,039 | 3/1967 | Nelson | 195—139LE |

A. LOUIS MONACELL, Primary Examiner

G. M. NATH, Assistant Examiner

U.S. Cl. X.R.

195—103.5, 127, 139